March 22, 1949.  R. R. DE MARTIN  2,464,854
TWO-WAY ADJUSTABLE FOUR JAW LATHE CHUCK
Filed Jan. 3, 1946  2 Sheets-Sheet 1
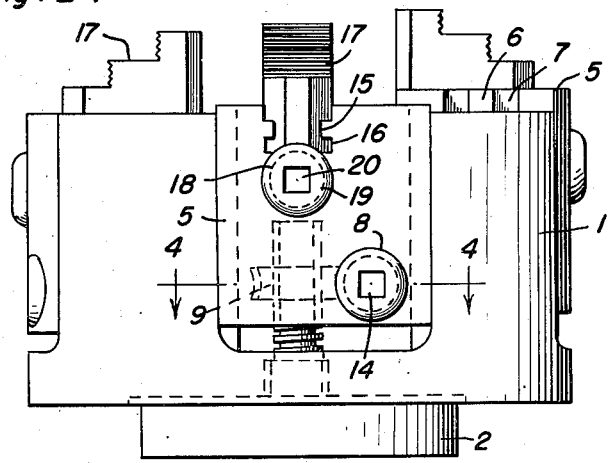
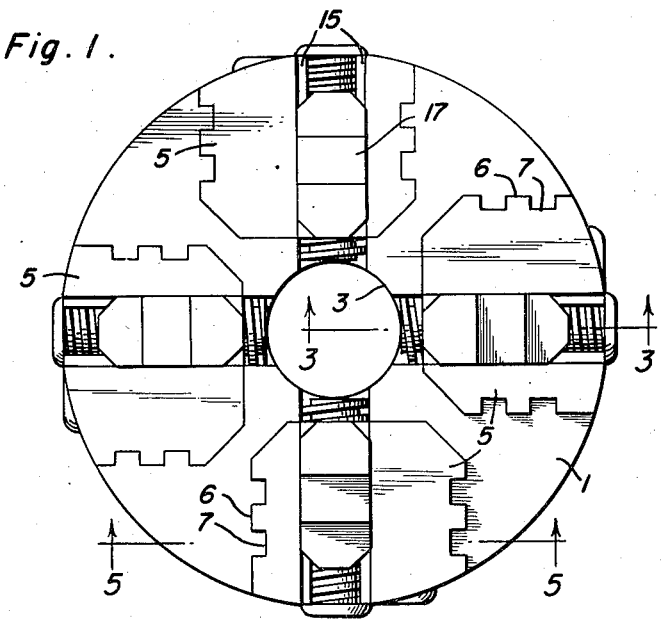
Inventor
Roger R. De Martin March 22, 1949.  R. R. DE MARTIN  2,464,854
TWO-WAY ADJUSTABLE FOUR JAW LATHE CHUCK
Filed Jan. 3, 1946  2 Sheets-Sheet 2

Inventor
Roger R. De Martin

By Clarence A. O'Brien
and Harvey B. Jacobson
Attorneys

Patented Mar. 22, 1949

2,464,854

UNITED STATES PATENT OFFICE 2,464,854

TWO-WAY ADJUSTABLE FOUR JAW LATHE CHUCK

Roger R. De Martin, Windsor, Ontario, Canada

Application January 3, 1946, Serial No. 638,791

2 Claims. (Cl. 279—112)

This invention relates to improvements in lathe chucks, and more particularly to a device of this character which is capable of holding regular or irregular pieces of uniform or different sizes in positions for working, and one wherein the desired adjustments may be easily made and effectively secured in set position.

An object of the invention is to provide an improved lathe chuck wherein the jaws may be adjusted both radially and longitudinally.

Another object of the invention is to provide an improved four jaw lathe chuck with means whereby the jaws and their holding blocks may be independently adjusted both radially and longitudinally of the work.

A further object of the invention is to provide an independently operated four jaw lathe chuck having means for selectively adjusting the jaws and their supporting blocks both radially and longitudinally, said chuck being highly efficient in operation and relatively inexpensive to manufacture and produce.

Other objects will appear as the description proceeds.

In the accompanying drawings which form a part of this application,

Figure 1 is a plan view of the improved four jaw lathe chuck;

Figure 2 is a side elevation of the improved four jaw lathe chuck;

Like characters of reference are used throughout the following specification and the accompanying drawings to designate corresponding parts.

Figure 3:
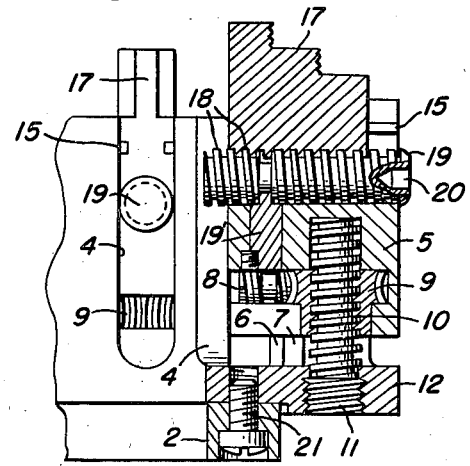
Figure 3 is a sectional view taken on the line 3—3 of Figure 1.
Figure 4:
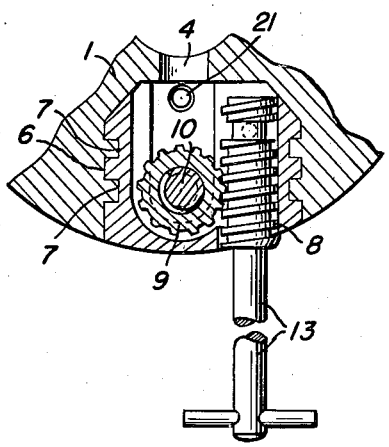
Figure 4 is a sectional view taken on the line 4—4 of Figure 2.
Figure 5:
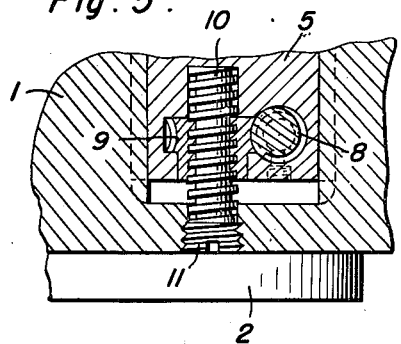
Figure 5 is a sectional view taken on the line 5—5 of Figure 1.

In carrying out the invention, there is provided a chuck body 1 which is equipped with the customary adaptor or attaching plate 2, a central opening 3, and radial slots 4 in which the jaw holding blocks 5 are adapted to be received.

The jaw holding blocks 5 are formed with the oppositely disposed slideways 6 which are longitudinally adjustable in the cooperating longitudinal slideways 7 formed in the opposite walls of the radial slots 4 in the chuck body 1.

A worm 8 is positioned radially in each jaw holding block 5, and is adapted to mesh with the worm gear 9 on the longitudinally extending fixed acme-threaded stud bolt 10, the same being formed at its lower end with an enlarged plug end having V-shaped threads 11 larger in diameter than the acme threads on the stud bolt 10. The enlarged plug end is securely threaded into the flange 12 of the chuck body 1, whereby when a T-wrench 13 having a square shank is inserted in the square socket 14 in the outer end of worm 8, rotation of the wrench will cause the block to move parallel the axis of rotation of the chuck body 1 in either direction depending upon the direction the wrench is turned.

Each jaw supporting block 5 is formed with radially extending spaced trackways 15 which cooperate with the trackways 16 formed on the opposite sides of the jaws 17, for radial adjustment towards and away from the central opening 3.

Figure 6:
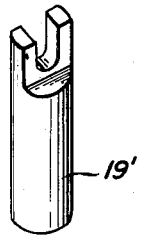
Figure 6 is a three dimensional view of a thrust used to retain one of the adjusting screws in place.

The jaws 17 have their lower edges threaded to cooperate with the acme threads 18 on the screws 19 extending radially through the upper portions of the jaw holding blocks 5. The screws 19 must be prevented from shifting longitudinally in the blocks 5, and Figure 6 illustrates a thrust 19' securable in each of said blocks and having a bifurcated end frictionally engaged in an annular channel in each of said screws 19. Square sockets 20 are formed in the outer ends of the screws 19 in which the square shank of the T-shape wrench 13 may be inserted to move the jaws radially towards or away from the central opening 3, depending upon the direction of rotation of the said wrench.

From the foregoing description, it will be readily seen that the jaws may be adjusted radially, while the jaw supporting blocks 5 may be adjusted longitudinally of the chuck body 1. Bolts 21 will secure the adaptor or attaching plate 2 to the chuck body 1, as shown in Figure 3 of the drawings.

While the preferred embodiment of the invention has been disclosed, it will be understood that it is not intended to limit the scope of the invention, as many minor changes in detail of construction may be resorted to without departure from the spirit of the invention.

Having thus described my invention what I claim as new and desire to secure by Letters Patent of the United States is:

1. A lathe chuck comprising a circular body having a centrally disposed axial bore extending therethrough, a plurality of radially extending longitudinally adjustable jaw-supporting blocks slidably supported in said chuck body and having spaced slideways formed in their opposite sides, spaced slideways on said chuck body engageable in said slideways, a circumferential flange about the inner end of said chuck body, longitudinally extending adjusting screws supported by said flange, adjusting nuts disposed on said screws for moving said block longitudinally of the chuck body, and stepped jaws supported upon said blocks for sliding radial adjustment.

2. A lathe chuck including a body, channels in said body disposed parallel the axis of rotation of said chuck and having longitudinally disposed slideways in the sides of said channels and spaced apart radially and arranged in sets, the channels being diametrically oppositely disposed, channels and jaws supporting blocks longitudinally adjustably mounted in said slideways, jaws radially adjustable in said blocks, and screw means to adjust and to hold said blocks in said channels, and other screw means to adjust and to hold said jaws in said blocks.

ROGER R. De MARTIN.

REFERENCES CITED

The following references are of record in the file of this patent:

UNITED STATES PATENTS

| Number | Name | Date |
|---|---|---|
| 346,133 | Singer | July 27, 1886 |
| 470,369 | Westcott | Mar. 8, 1892 |
| 767,876 | Eichblatt | Aug. 16, 1904 |
| 1,845,226 | Bogart | Feb. 16, 1932 |